March 18, 1941.  R. P. M. DAVIS  2,235,609
DISCHARGE MECHANISM FOR RECEPTACLES
Filed July 8, 1938
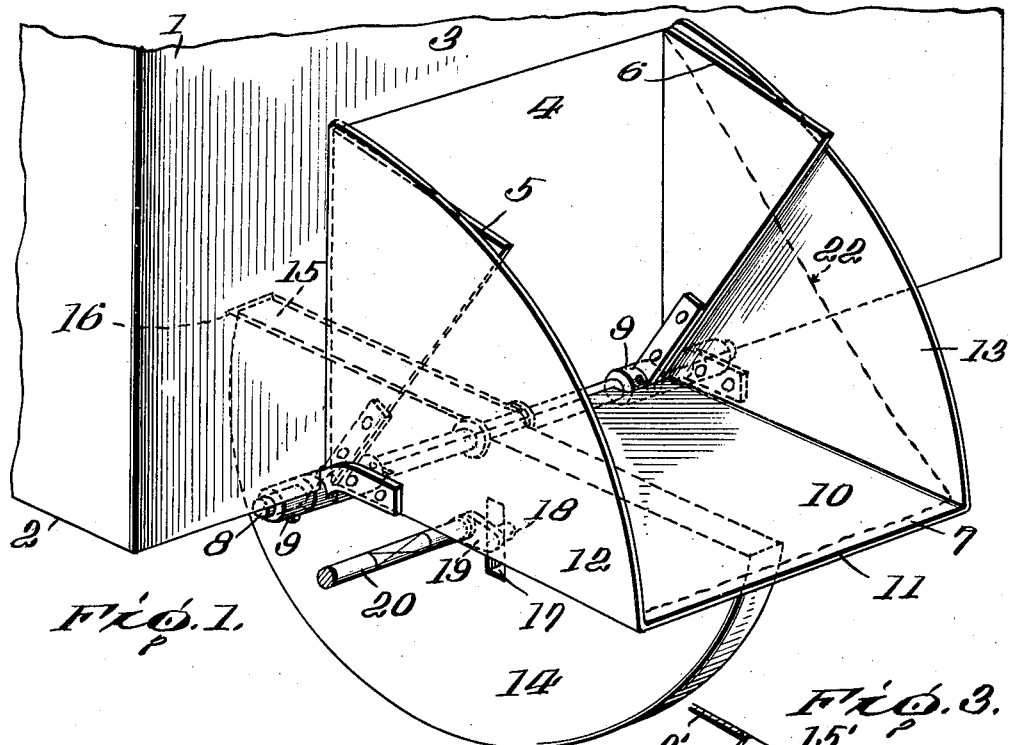
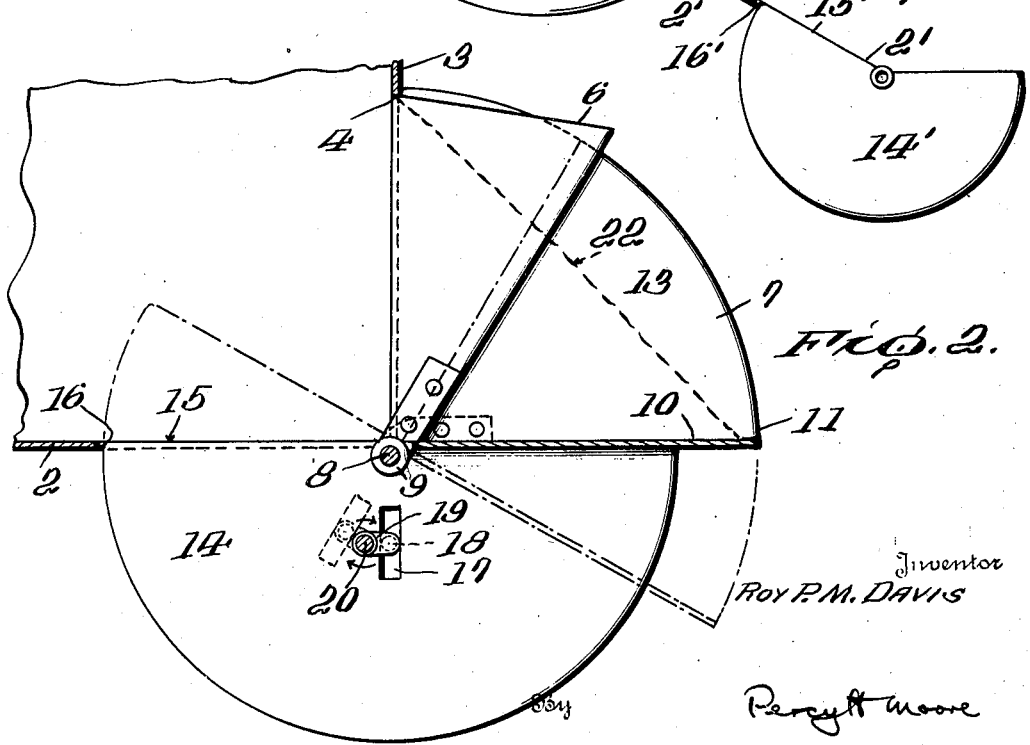
Inventor
Roy P. M. Davis
Percy H. Moore
Attorney Patented Mar. 18, 1941

2,235,609

UNITED STATES PATENT OFFICE 2,235,609

DISCHARGE MECHANISM FOR RECEPTACLES

Roy P. M. Davis, Hollywood, Calif.

Application July 8, 1938, Serial No. 218,251

4 Claims. (Cl. 221—120)

My invention relates to improvements in means for delivering material from receptacles and the like.

The principal object of my invention is to provide a device adapted to be attached to a receptacle or bin or equivalent member, in which the material is container or from or through which the material flows, for regulating and positively feeding and discharging the material therefrom.

Another object is the provision of an oscillating means for agitating and positively pushing the flowing material outwardly through a discharge opening formed in the receptacle, in such a manner that the material is prevented from becoming clogged or arched in the receptacle.

A further object is to provide a feeding mechanism of simple and inexpensive construction which is readily adaptable for use with any container for regulating and uniformly feeding the material being delivered from the discharge opening therein.

These and other objects and advantages will be apparent as the specification is considered in connection with the accompanying drawing wherein:

Figure 1 is a perspective view of a receptacle showing my feeding device applied to one of the walls thereof;

Figure 2 is a vertical sectional view of the chute and feeding disk attached to a wall of the receptacle; and Figure 3 is a side elevation of a modified form of feeding disk.

Referring more particularly to the drawing, wherein like reference characters designate similar parts throughout the views, the numeral 1 represents a conventional bin or other receptacle, which in the preferred form of my invention is formed with a relatively flat bottom 2 and a vertical front wall 3, the rear wall thereof being omitted from the drawing. The front wall 3 is provided with a suitable discharge opening 4 to permit the material flowing from the receptacle to be discharged therefrom by the force of gravity. The opening 4, which for the purposes of illustration is shown of substantially rectangular form, is provided on each side with forwardly extending wings 5 and 6, which guide the flowing material as it passes through the discharge opening to a chute 7, mounted on a shaft 8, suitably arranged in the receptacle at the junction of the discharge opening 4 and the flat bottom 2 and extending across the opening and mounted in suitable bearings 9.

The chute 7 comprises a flat bottom 10, open outer end 11 and side walls 12 and 13 which walls are of such height and dimensions that they at all times engage with and overlap the outer faces of the wings 5 and 6 whereby the material flowing through the discharge opening by the force of gravity is prevented from flowing over the sides of the chute. A disk 14, substantially semi-circular in shape, is loosely mounted on the shaft 8, preferably in the center thereof, and the upper edge 15 extends into and is movable upwardly through a slot 16 in the bottom 2 of the receptacle, when the chute and disk are actuated in a manner presently described. The radius of the disk may vary in extent from one third that of the height of the discharge opening 4 to approximately the entire height thereof, as shown in Figure 2 of the drawing, whereby upon downward movement of the chute the disk 14 moves through the material in the receptacle and pushes the same forwardly through the discharge opening onto the chute. The disk preferably ranges in thickness from approximately one half inch to approximately six inches, according to the class of material being handled, although these dimensions are given by way of illustration only and I am not to be limited thereto. The shaft 8 acts as a common axis for the chute 7 and disk 14. While I have shown but a single disk and slot, it is to be understood that two or more disks and slots may be used in spaced relation should the character of the material so require it.

The disk 14 is provided with a radially arranged slot 17 which receives a wrist pin 18 mounted on a crank 19 in turn carried on a shaft 20, suitably journalled in bearings, not shown, carried by the frame of the receptacle support or other means, also not shown. The shaft 20 is rotated by a motor of any desired type through gear or other mechanism, not shown. By virtue of this construction, it will be seen that rotation of shaft 20 causes the wrist pin 18 to travel in the slot 17 and oscillate the disk 14 and chute 7 and cause the upper edge 15 of the disk to move upwardly through the slot 16, in the bottom wall of the receptacle and to cut through the flowing material to the dotted line position shown in Figure 2 and back again to full line position. When the chute is in normal elevated or horizontal position, the upper edge 15 of the disk fits within and substantially closes the receptacle slot 16 so that the material can not pass therethrough.

In the operation of my device it will be seen that when the shaft 20 is rotated the disk 14 and the chute 7 will be oscillated. The upper edge 15 of the disk cuts upwardly and forwardly through the material and pushes the same outwardly onto the chute and the oscillation of the chute results in a steady flow of material being discharged from the receptacle.

The rate at which the material is discharged from the receptacle is governed by the speed at which the chute and disk are oscillated through the medium of rotating shaft 20, thus allowing of a very accurate and uniform feeding and flow of the material from the receptacle into the chute, which movement of the disk also prevents any clogging or stoppage of the material.

While I have described my device as being associated with flat bottomed receptacles or bins the same is also capable of use with receptacles having slanting bottoms, as shown in Figure 3, when so used it is preferable to employ the modified form of disk 14', also shown in Figure 3, wherein the circumference of the disk is somewhat extended, so that the upper edge 15' thereof extends into and is movable upwardly through the slot 16' in the sloping bottom wall 2' of the receptacle. In both forms, the disk is given the same throw or movement and is caused to extend into and move through the material in the receptacle.

As the flat bottom 10 of the chute 7 is at least equal in length to the height of the discharge opening 4, it will be seen that when the chute is in elevated position, with the bottom extending horizontally, the line of repose of the loose material will be at an angle of approximately forty-five degrees, between the upper end of the discharge opening 4 and the outer end of the chute, as shown by the dotted line 22 in Figure 2, whereby the material will be prevented from flowing out of the chute.

While I have shown the particular type of means for oscillating the chute and disk, it will be understood that various other means may be satisfactorily used. For example, the chute 7 and disk 14 could be keyed or otherwise fixedly mounted on the shaft 8 in which event the shaft 8 would be oscillated by any suitable means.

The invention is particularly adapted for handling rock or ore ranging in size from run mine to fines. However, it is to be understood that I do not desire to limit the invention to the handling of these specific materials.

Having thus described my invention, what I claim is:

1. A device of the character described for feeding material from a receptacle having a discharge opening in its vertical front wall and a slot in the bottom wall thereof, comprising a shaft adapted to be mounted at the lower end of the discharge opening, a chute loosely mounted on said shaft, a substantially semi-circular plate loosely carried by the shaft and secured to said chute, the upper edge of said plate normally fitting within and lying flush with the upper edge of the slot, and means associated with and having means engageable with the plate for simultaneously oscillating said plate and chute.

2. A device of the character described for feeding material from a receptacle having a discharge opening in its vertical front wall and a slot in the sloping bottom wall thereof, comprising a shaft adapted to be mounted at the lower end of the discharge opening, a chute loosely mounted on said shaft, a plate secured to said chute and having a segmental cut out portion, one edge of said portion normally fitting within and lying flush with the upper edge of the slot in the sloping wall of the receptacle, and a shaft associated with and having offset means thereon engageable with said plate for simultaneously oscillating said plate and chute.

3. A device of the character described for feeding material from a receptacle having a discharge opening in its front wall and slots in the bottom wall thereof, comprising a shaft adapted to be mounted at the lower end of the discharge opening, a chute loosely mounted on said shaft, plates secured to said chute and having edge portions thereon adapted to normally fit within and lie flush with the upper edges of said slots, and means adjacent to and associated with and having means engageable with said plates for simultaneously oscillating said chute and plates.

4. A device of the character described for feeding material from a receptacle having a discharge opening in its front wall and a slot in the bottom wall thereof, comprising a shaft adapted to be mounted in the receptacle at the lower end of the discharge opening, a chute loosely mounted on said shaft, a plate rigidly carried by the chute and having a radial slot and a segmental cut out portion with one edge of said plate extending through said slot, a driven shaft, a crank carried by the shaft, a wrist pin carried by the crank and operating in said radial slot in the plate whereby the rotation of the shaft oscillates the plate and causes an oscillation of the chute.

ROY P. M. DAVIS.